Jan. 15, 1957
G. DALIANIS
2,777,195
FOLDING PARING KNIFE
Filed Nov. 5, 1954
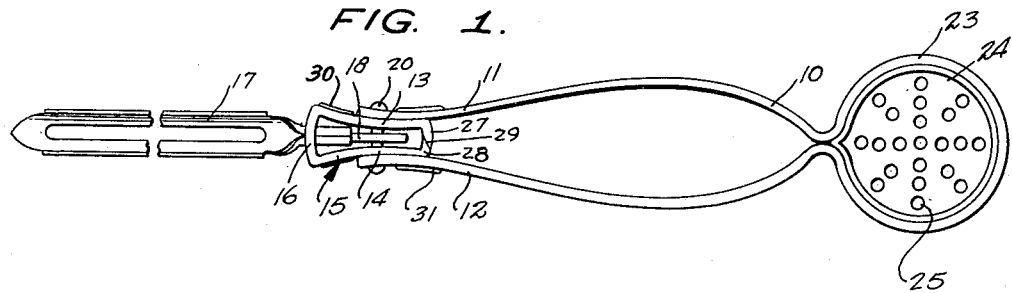
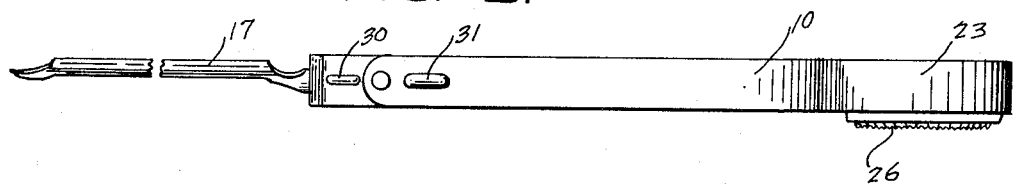
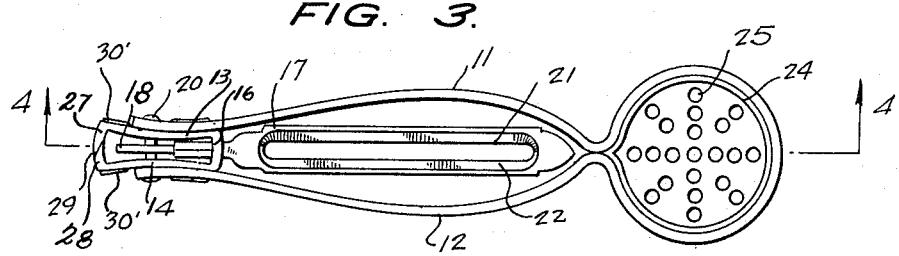
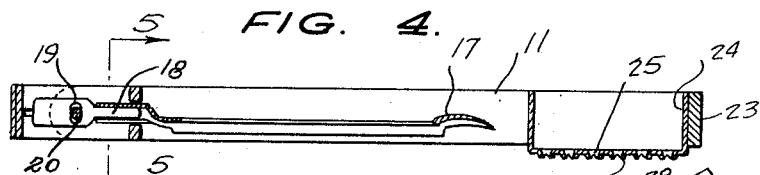
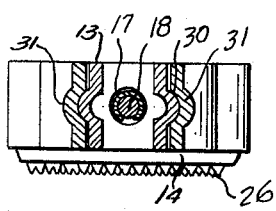
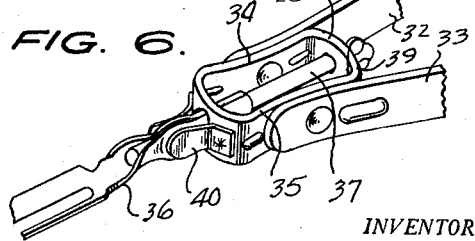
INVENTOR.
GEORGE DALIANIS,
BY
McMorrow, Berman & Davidson
ATTORNEYS.

United States Patent Office 2,777,195
Patented Jan. 15, 1957

2,777,195

FOLDING PARING KNIFE

George Dalianis, Wappingers Falls, N. Y.

Application November 5, 1954, Serial No. 466,985

2 Claims. (Cl. 30—155)

The present invention relates to kitchen utensils having a blade mounted in one end for paring vegetables, on the other end provided with a grater for grating the surfaces of vegetables and other articles of food.

The primary object of the present invention is to provide a combination paring knife and grater in which the knife portion folds back within the handle, and in which the grating portion of the tool provides an extra length to the handle.

Another object of the present invention is to provide a paring knife of the type having a rocking blade moveable in either direction and having cutting edges facing each other, one of which forms a guide for the other blade, and in which the blade is swingable to a position within the handle.

A further object of the present invention is to provide a combination paring knife and grater having a blade swingable from a position extending outwardly from the handle to a position within the handle, and one providing detent means for locking the blade in either the extended position or in the position within the handle.

These and other objects and advantages of the present invention will be fully apparent from the following description when taken in connection with the annexed drawing, in which:

Figure 1 is a top-plan view,

Figure 2 is a side view in elevation, with the blade extended,

Figure 3 is a top-plan view with the blade folded within the handle,

Figure 4 is a side view in cross-section on line 4—4 of Figure 3,

Figure 5 is an end view in cross-section on line 5—5 of Figure 4, and

Figure 6 is a partial perspective view showing an improved form of the anchoring means for the blade.

Referring in greater detail to the drawing in which like numerals indicate like parts throughout the several views, the present invention is seen to consist of a handle 10 formed of a resilient strip of metal and having a pair of arms 11 and 12, the portions of the arms adjacent the free ends being disposed in spaced relation with respect to the legs 13 and 14 of a U-shaped member 15 extending longitudinally between the free end portions of the arms and with the bight 16 of the U-shaped member 15 exteriorly of the free end portions.

An elongated blade 17 is provided having a stem provided with an aperture 19. An elongated rivet 20 extends from the outer face of the arm 11 to the outer face of the arm 12, passing through holes in each of the legs 13 and 14 and through the aperture 19 in the stem 18, and connecting the legs 13 and 14 of the U-shaped member 15 to the arm free end portions for swinging movement about an axis transversely of the arm end portions from the position in which the bight 16 is exteriorly of the free end portions to a position in which the bight 16 is between the free end portions. In each of said positions, the blade 17 is disposed longitudinally of the free end portions of the arms and the stem 18, the latter being connected to one end of the blade and extending through the bight 16.

The blade 17 has a convex undersurface sharpened on each side of an opening formed therein to provide the cutting edges 21 and 22 as seen in Figure 3.

At the other end of the handle 10 remote from the blade 17, the strip of metal from which the handle is formed is bent back upon itself to form a circular loop 23 which receives the grater element 24 having a shape substantially that of a cup with outwardly struck perforations 25, each of them providing sharp edges as indicated by the reference numeral 26 in Figure 2.

The free ends of each of the legs 13 and 14 are formed with inwardly bent flanges 27 and 28, respectively. The ends of the flanges 27 and 28 are formed with complemental sloping faces which slide one upon the other whenever the legs 13 and 14 are moved toward each other. The sloping surfaces of the end edges of the flanges 27 and 28 are indicated in Figures 1 and 3 by reference numeral 29.

Detent means are provided for the purpose of securing the blade in the longitudinally extended position and also in the folded position and consists in the elongated buttons 30 and 30' provided on the outer and confronting faces of the legs 13 and 14 of the U-shaped member 15, the buttons 30 (Figures 1 and 2) being adjacent the bight 16 of the U-shaped member 15 and the other buttons 30' being adjacent the free ends of the legs 13 and 14, as seen in Figure 3. An outwardly struck portion 31 on each of the end portions of the arms 11 and 12 provides a recess on the inner and confronting faces of the arm end portions receivably engaging the buttons 30 when the blade 17 is in the folded position and the buttons 30' when the blade is in a longitudinally projecting position relative to the arm end portions. When the blade and the U-shaped member are swung from the positions shown in Figures 1 and 2, in which the blade and U-shaped member are arranged longitudinally of and projecting from the arm end portions to a folded position shown in Figures 3 and 4, in which the blade and the U-shaped member are disposed between the arms and the arm end portions, respectively, the buttons upon leaving the recesses cause the legs to move toward each other and the flanges to move so that their sloping surfaces frictionaly engage each other, forcing one flange to slide upon the other and adding resistance to the initiation of such swinging movement in either a clockwise or a counterclockwise direction.

In Figure 6 is shown a second embodiment of the present invention in which the arms 32 and 33 of the handle portion of the invention are disposed in spaced-apart relation with the legs 34 and 35 of a U-shaped member disposed in confronting face-to-face relation with the arms 32 and 33.

The stem 36 of the blade portion of the present invention is flattened and formed into a sleeve which receives the rod 37 which projects through a hole in the bight portion of the U-shaped member. The other end of the rod 37 is anchored for limited pivotal motion in one of the flanges 38 and 39, which have a similar sloping surface on each of them, providing a resistance to movement of the legs 34 and 35 toward each other when the blade portion is swung from its longitudinally extended position to its folded position.

The tabs 40, of a substantial L-shape, have their one leg welded to the bight of the U-shaped member and the other legs extending on each side of the stem 36, providing a stop means for the wobble or pivotal movement of the blade relative to the arms 32 and 33.

In the first embodiment, shown in Figures 1 to 5, the eye formation 19 is a hole slightly larger than necessary for the rivet 20 to provide for the limited pivotal movement of the blade 17 relative to the U-shaped member 15.

While only preferred embodiments of the present invention have been here illustrated and described, it is believed that other embodiments may be made and practiced within the scope of the appended claims without departing from the spirit of the invention.

What is claimed is:

1. A paring knife comprising a handle including a pair of resilient arms having the portions adjacent the free ends disposed in spaced relation, a resilient U-shaped member arranged so that its legs extend longitudinally between the free end portions of said arms with the bight exteriorly of said free end portions and having its legs connected to said free end portions for swinging movement about an axis extending transversely of said free end portions from the position in which its bight is exterior of said free end portions to a position in which its bight is between said free end portions, a blade positioned longitudinally of the free end portions of said arms and having a stem on one end extending loosely through the bight of said U-shaped member and connected to the legs of said U-shaped member for swinging movement therewith, said loose extension of said blade stem through the bight of said U-shaped member permitting limited turning movement of said blade, each of the legs of said U-shaped member having at its free end a flange, said flanges overlappingly engaging each other to resist the initiation of the movement of said U-shaped member from its position in which the bight is exteriorly of the free end portions of said arms toward the position in which the bight of the U-shaped member is between the free end portions of said arms and the movement of the U-shaped member from its position in which the bight of the U-shaped member is between the free end portions of the said arms toward the position in which the bight of the U-shaped member is exteriorly of the free end portions of said arms, and cooperating means on said free end portions of said arms and on the legs of said U-shaped member and interengaging each other to releasably hold the bight of said U-shaped member in either of its positions exteriorly of the free end portions of said arms or between the last-named portions.

2. A paring knife comprising a handle including a pair of resilient arms having portions adjacent the free ends disposed in spaced relation, a resilient U-shaped member arranged so that its legs extend longitudinally between the free end portions of said arms with the bight exteriorly of said free end portions and having its legs connected to said free end portions for swinging movement about an axis transverse of said end portions from the position in which the bight is exterior of said free end portions to a position in which its bight is between said free end portions, a blade positioned longitudinally of the free end portions of the arms and having a stem on one end extending loosely through the bight of said U-shaped member and connected to the legs of said U-shaped member for swinging movement therewith, said loose extension of said blade stem through the bight of said U-shaped member permitting limited turning movement of said blade, cooperating means on said free end portions of said arms and on the legs of said U-shaped member and interengaging each other to releasably hold the bight of said U-shaped member in either of its positions exteriorly of the free end portions of said arms or between the last-named portions, said cooperating means being operable to move said legs toward each other upon execution of swinging movement of said legs of said U-shaped member relative to said arm end portions, each of said legs of said U-shaped member having at its free end a flange, said flanges having on their end edges complemental surfaces frictionally engageable together when said legs are moved toward each other so as to resist the initiation of movement in either direction of said U-shaped member from either of said positions to the other.

References Cited in the file of this patent
UNITED STATES PATENTS

| | | |
|---|---|---|
| 228,660 | McDonald | June 8, 1880 |
| 789,539 | Harris | May 9, 1905 |
| 1,372,325 | Willemin | Mar. 22, 1921 |
| 2,220,169 | Murdock | Nov. 5, 1940 |